Patented July 7, 1925.

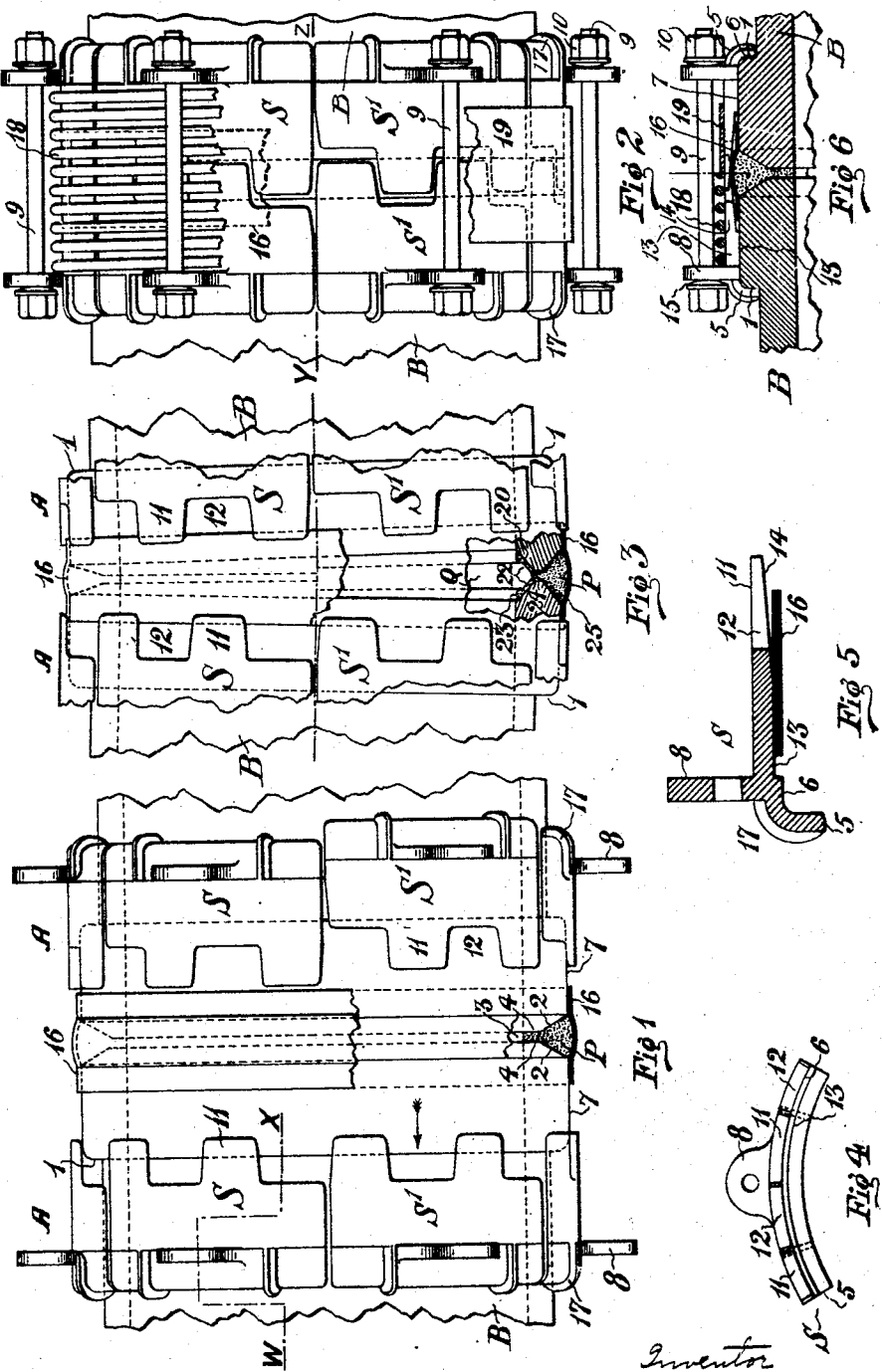

1,545,221

UNITED STATES PATENT OFFICE.

CHARLES WILLIAM WATSON, OF ST. KILDA, VICTORIA, AUSTRALIA.

PIPE AND OTHER JOINT AND THE LIKE.

Application filed June 20, 1923. Serial No. 646,728.

*To all whom it may concern:*

Be it known that I, CHARLES WILLIAM WATSON, a subject of the King of Great Britain and Ireland, residing at 1 York Street, St. Kilda, in the State of Victoria, Commonwealth of Australia, have invented certain new and useful Improvements in and Relating to Pipe and Other Joints and the like; and I do hereby declare the following to be a full, clear, and exact description of the invention, such as will enable others skilled in the art to which it appertains to make and use the same.

This invention relates to joints, couplings, and the like and provides for effecting connection and disconnection of pipes, columns, shafts, bars and the like; and includes means usable as an aperture or leak closer. By means of my invention separate forces are applied in three different directions by means of co-operating mechanical elements. The said elements are so arranged that on the application of two linearly opposing forces they will be urged towards each other, engage a pair of structures to be united, and during the uniting operation compress a member inserted between the structure, but in addition a third force will operate on the compressed member, compressing it in still another direction. These and other features of the invention will now be explained by the aid of the accompanying drawings.

In the following description the application of the invention is explained relatively to a pair of pipes, the ends of which are preferably but not arbitrarily of abutting type, having limiting or positioning means, such as the shoulder of a faucet, near each end; but other limiting means can be employed.

The forms of parts used for jointing are not limited to those illustrated, modifications and alternatives lying within the ambit of the invention.

Like reference characters designate corresponding parts in the drawings which are diagrammatic.

In the drawings Figure 1 illustrates an unfinished joint in which are used annuli in segmented form, a retainer element being omitted.

Figure 2 shows the joint of Figure 1 closed, and with at the upper part a retainer of spring type, and at the lower part one of band type.

Figure 3 shows the joint of Figure 1 but with at the lower part of the figure in section, modified pipe ends, and modified insertion.

Figure 4 shows in elevation a segment of an annulus as seen looking in the direction of the arrow in Figure 1.

Figure 5 is on a larger scale and also shows a section of an annulus segment on line W—X of Figure 1.

Figure 6 is partly in vertical section, on line Y—Z of Figure 2, but the left hand part shows a spring retainer, and the right hand part a band retainer.

In applying the invention to structures to be united I provide co-operating annuli A, which embrace the ends of the structures, with uniting and adjusting means as bolts and nuts, tightening of which compresses the insertion or packing.

I illustrate divided co-operating elements, such as a pair S $S^1$ of segmented annuli, in order to secure the advantages undermentioned.

By this arrangement repairs or adjustments can be effected at parts of joints without disturbing the remainder; and a wide range of flexibility can be secured.

Internal as well as external jointing pressure is obtainable.

By appropriately contouring the surfaces of the ends of structures to be united, and/or of the compressible member or packing between them, and adjunctive elements, including the retainer 18 or 19 for example, hereinafter described, a wide range of alignment deflection of the structures is obtainable.

Ends are shown of structures as pipes or tubes B, each presenting an opposed surface 2 between which is space for an insertion member or packing P, of any suitable design and material. Compressible, or resilient material, such as rubber; is suitable for many purposes, but other known material may be employed.

The periphery of the packing may project to present an arched or domed surface as illustrated, or it is otherwise contoured. Means for increasing areas of contact and resistance to displacement are providable. Thus the contacting surfaces of the structure ends and the packing will be, when desired, grooved, radially or circularly, or otherwise; but my selected surfaces may be smooth to make a surfaced joint. In Figure 1 the packing is of Y form, and the form may be varied indefinitely.

As illustrated, the packing inner part 3 in Figure 1 will co-act with opposing faces 4, inwards of surfaces 2, between which is the body of the packing. In Figure 3 there is in the packing a neck 24, between the packing body and walls 22 hereinafter referred to.

The inner surfaces of the annuli or their fingers are flat as at 13, beveled as at 14, or curved, or otherwise shaped, as the application of the invention may require. Each annulus is advantageously constructed of a plurality of segments, S, $S^1$, provided along an edge with claws, or lugs 5, to engage a projection or shoulder 1 on a structure end B, the shoulder operating in a limiting or positioning capacity, or as a fulcrum against which the segments can oscillate or pivot, an internal surface 6 of the segment being capable of contacting with an outer surface 7 of the pipe end.

In one type of annulus each segment S has a series of fingers 11 alternating with gaps 12; these fingers will enter gaps of an opposing segment, and the sides of fingers 11 and gaps 12 taper to secure flexibility. The fingers may be hinged in place; they may consist of flexible material integral with, or connected in any approved manner to, the annulus. The annuli operate to compress the packing in the plurality of directions predetermined. Thus the inner surface of a segment is shown in Figure 5 with a flat 13 and a bevelled surface 14. In Figure 6 the flat surface 13 is slightly modified from the position in Figure 5. Flat 13 contacts with the faucet circumferential surface for guiding purposes, and surface 14 with the circumferential surface of the packing P, to effect convergent compression of same.

After direct compressive effects of oblique surfaces 14 terminate, due to the approach of the annuli towards one another, so that the surfaces 13 slide over the packing, there will be a continuation of compressive action, but due only to the forces operating parallel to the axis of the joint or substantially so.

In order that the packing P may be preserved from distortion, or injury through friction of the fingers, and to facilitate assemblage an overlapping positioning member shown as a ring 16, preferably of yielding character may be inserted (see Figure 6) between the segments and the packing. This ring is in some cases provided with a concavity to receive the packing. When resilient (as of rubber) it acquires any appropriate contour naturally.

The employment of a ring 16 of such diameter as will enable portion of it to cling somewhat to a structure end facilitates assemblage; the remainder of the ring would extend beyond the structure end for a purpose hereinafter explained. Pipe ends may be formed with an annular recess (not shown) to receive and prevent displacement of such a ring. But in many applications of the invention no ring is desirable.

Each segment is provided with a lug 8 to accommodate securing bolts 9 having nuts 10. Domed washers 15 may be conveniently employed to ease adjustment of segments S, and to suit the contour or alignment of structure B. Segments are shown with strengthening ribs 17 adoptable at will.

The annuli are embraced by a retaining member which may be of resilient type such as a coiled spring 18, or a band 19, but the embracing means is in some cases flexible or rigid, thus a solid or split ring or cylinder is usable. This member not only facilitates assembling, but subsequently both sets of annuli are held by it concentrically. This is a member which if not found to be required can be omitted in practice.

One or each annulus may be an integral element, slipped on or around the desired structures.

By employing modified structure ends and compressible packing as in Figure 3 the pressure on the latter will in practice be increased by internal fluid pressure. The ends of the structures B are in Figure 3 shaped so that when assembled, they will unitedly present a cross section of approximately X form, ensuring annular recesses or chambers, shown as the inner one 20 and the outer one 25 to receive packing of flexible or resilient type; the packing occupying the outer chamber is preferably solid, and its inner part has a circular recess Q formed by providing oblique walls 22, which are plain, or reinforced by any appropriate means, and are shown with beaded or thickened edges 23. The jointing pressure is therefore substantially contributed to by any fluid pressure on the inner surfaces of the walls.

The initial overall width of walls 22 is preferably greater than the width of the inner chamber 20 of the joint, so that when the joint is completed the packing constituting the walls is compressed. On the structures being moved towards each other the exterior surfaces of the walls 22, and surfaces of chamber 20 are thus the first to contact. Pressure is thus exerted on walls 22, to locate them in their chamber, and hold them.

To suit joints of wedge form, as viewed in Figure 3, the packing, P, and resilient member 16 are, with the retainer as 19, of corresponding wedge form; and thus at one extremity of a diameter of predetermined width; and at the opposite extremity of that diameter of either lesser or greater width.

This modification permits of deviations in alignment of jointed structures, by reason of the form of the packing, while the efficiency of the joint is maintained. The ends of the structures can be modified to possess faces to suit angles in the pipe line or the like, and these faces may be parallel or otherwise, the assembly permitting of the use of packing rings of wedge form, or with parallel faces. The choice of a ring may be regulated by considering any probable further deviation in the alignment.

Where a structure has not shoulders for claws 5 to contact with, means may be affixed to each structure for claws to bear on, and the invention can thus be applied to structures not originally designed for my joining device.

Annuli claws are not essential in a leak or aperture closer, but can be utilized to enclose packing, the positioning means as 1 being unnecessary. On the packing being applied to the leak or aperture, the annuli are set around the structure, enclosing the packing, and the nuts are tightened.

The material of the structure may permit the claws to indent the structure, and resist displacement.

To effect a joint, one pipe end is placed in position, and if the packing positioning ring 16 is used, part of it is positioned around the pipe end. The packing is next inserted. The retaining member 18 or 19 is next applied. An annulus S is then set with its fingers overlapping the ring 16, and under member 19, the claws 5 engaging shoulder 1. The end of the opposing pipe is then entered within the free portion of ring 16, under part of retainer 19 and set close against packing P. The annulus at that side is then applied, its fingers entering the gaps of the opposite annulus. Then bolts 9 are passed through the lugs, and nuts 10 are tightened, drawing the pipes together, and compressing the packing in the respective opposed directions. When the surface 14 contacts directly (ring 16 being omitted) or indirectly (ring 16 being retained), with the domed head of packing P, the latter is compressed convergently by reason of the constricting movement of the bevelled faces 14.

The retaining element 18 or 19 is useful to hold the annuli segments in proper lineal relationship but by having a resilient or yielding retainer 18, considerable flexibility is possible in the joint without leaking occurring. The fingers 11 are shown with clearance around these edges to facilitate the said flexibility.

Instead of using the fingers described the body of each annulus may extend as cylinders towards the other to engage as much of the peripheral surface of packing P as desired, and such extensions may telescope with one another protecting the packing. The periphery of the packing if not domed, or if the tapered or bevelled face 14 is replaced by a flat face, will not prevent the compressions of the packing occurring in the respective directions aforesaid.

For brevity I hereinafter term the packing ring or material a sealing member. The convergent compression I refer to hereinafter, as compression towards the centre, meaning towards the axis of the joint.

I claim:—

1. In jointing devices, opposed segmental annuli retained by encircling means, the opposed segments of the annuli having means for drawing them towards one another to force the structures to be jointed towards one another, the segments of each annulus having projections to engage recesses between the projections of the opposed annulus, the projections being flexible, the flexibility outwardly being within the limitation of the encircling means aforesaid.

2. A pipe coupling comprising opposed annuli each having packing engaging surfaces adapted to exert compression radially inward, an annular packing having a domed outer surface adapted to be engaged by said annuli and compressed inwardly between opposed pipe ends, said packing being wedge-form in radial cross section and having divergent inner wings or walls adapted to be compressed outwardly against the inner ends of the opposed pipes, and means for drawing said annuli and pipe ends toward each other.

3. A detachable pipe coupling comprising segmental annuli each provided with a tapered packing engaging surface adapted to exert radially inward compression, a pair of pipe sections having outwardly tapered end walls and circumferential shoulders, a packing of wedge-form in radial cross section and having an outer annular convex surface adapted to be engaged by the aforesaid annuli, said packing being seated between the tapered walls of said pipe sections, shoulder engaging means carried by said annuli, and means for drawing said annuli toward each other to couple said pipe sections and simultaneously compress said packing radially inward.

In witness whereof I have hereunto set my hand.

CHARLES WILLIAM WATSON.

Witness:
GEORGE G. TURRI.